(12) United States Patent
Kim et al.

(10) Patent No.: US 11,845,403 B2
(45) Date of Patent: Dec. 19, 2023

(54) ROOF RACK APPARATUS FOR A VEHICLE

(71) Applicants: HYUNDAI MOTOR COMPANY, Seoul (KR); KIA CORPORATION, Seoul (KR); JIN WON CO., LTD, Ulsan (KR)

(72) Inventors: Soo Nam Kim, Gwacheon-si (KR); Jin Ho Lee, Suwon-si (KR); Sung Min Eom, Daegu (KR); Chi Ho Han, Ulsan (KR); Sang Hoon Han, Seoul (KR)

(73) Assignees: HYUNDAI MOTOR COMPANY, Seoul (KR); KIA CORPORATION, Seoul (KR); JIN WON CO., LTD, Ulsan (KR)

( * ) Notice: Subject to any disclaimer, the term of this patent is extended or adjusted under 35 U.S.C. 154(b) by 0 days.

(21) Appl. No.: 17/829,461

(22) Filed: Jun. 1, 2022

(65) Prior Publication Data

US 2022/0396214 A1 Dec. 15, 2022

(30) Foreign Application Priority Data

Jun. 10, 2021 (KR) ........................ 10-2021-0075340

(51) Int. Cl.
*B60R 9/058* (2006.01)
(52) U.S. Cl.
CPC .................... *B60R 9/058* (2013.01)
(58) Field of Classification Search
CPC .. B60R 9/05; B60R 9/04; B60R 9/045; B60R 9/00; B62D 65/16
See application file for complete search history.

(56) References Cited

U.S. PATENT DOCUMENTS

| | | | | |
|---|---|---|---|---|
| 5,975,391 | A * | 11/1999 | Aftanas | B60R 9/04 224/326 |
| 7,695,038 | B2 * | 4/2010 | Harberts | B60R 13/04 296/210 |
| 8,627,989 | B2 * | 1/2014 | Aftanas | B60R 9/058 224/326 |
| 9,187,047 | B2 * | 11/2015 | Sautter | B60R 9/045 |
| 11,186,230 | B2 * | 11/2021 | Kim | B60R 9/058 |
| 2005/0236342 | A1 * | 10/2005 | Jeong | B60R 9/04 211/20 |

(Continued)

FOREIGN PATENT DOCUMENTS

| | | |
|---|---|---|
| KR | 101764457 B1 | 8/2017 |
| KR | 102053072 B1 | 1/2020 |

*Primary Examiner* — Brian D Nash
(74) *Attorney, Agent, or Firm* — LEMPIA SUMMERFIELD KATZ LLC (57) ABSTRACT

A roof rack apparatus for a vehicle includes a roof rack mounting bracket, a roof rack stanchion, a roof rack side rail, and a roof rack pad, such that it is possible to ensure structural durability further improved by a fastening force between an insert bolt and a bracket fixing bolt at the time of assembling the roof rack apparatus with a vehicle body. The roof rack mounting bracket is symmetric in a forward/rearward direction and a leftward/rightward direction with respect to a center of the insert bolt, such that the roof rack apparatus may be used in common. An operator may replace the roof rack with a new roof rack without detaching an interior material (head lining) in the vehicle, such that it is possible to prevent damage to the interior material at the time of replacing and repairing the roof rack.

9 Claims, 7 Drawing Sheets

(56) References Cited

U.S. PATENT DOCUMENTS

| | | | |
|---|---|---|---|
| 2006/0283900 A1* | 12/2006 | Stapleton | B60R 9/045 |
| | | | 224/330 |
| 2009/0026238 A1* | 1/2009 | Binder | B60R 9/04 |
| | | | 224/309 |
| 2017/0015253 A1* | 1/2017 | Shibata | B60R 13/07 |
| 2020/0247325 A1* | 8/2020 | Jung | B60R 9/058 |
| 2020/0377026 A1* | 12/2020 | Kim | B60R 9/04 |
| 2021/0245668 A1* | 8/2021 | Tertuliani | B60R 9/058 |

* cited by examiner

ROOF RACK APPARATUS FOR A VEHICLE

CROSS REFERENCE TO RELATED APPLICATION

This application claims priority to and the benefits of Korean Patent Application No. 10-2021-0075340, filed Jun. 10, 2021, the entire contents of which are incorporated herein by reference.

BACKGROUND

Field

The present disclosure relates to a roof rack apparatus for a vehicle, and more particularly, to a technology related to a roof rack apparatus for a vehicle, which is capable of ensuring durability when being assembled with a vehicle body and easily separated from the vehicle body.

Description of the Related Art

A user loads and transports articles using a roof rack mounted on a roof panel when the user intends to use a wide interior space in a vehicle or when the user cannot load an article into the interior space of the vehicle when the article to be loaded is too large in size.

The roof rack is one of the convenient components mounted on the vehicle. The roof rack is fixed to a roof panel which is an upper surface of a roof of the vehicle. Articles, such as recreational gear (e.g., skis having a comparatively large volume), can be loaded onto the roof rack. The roof rack is widely used in recreational vehicles (RVs) or sport utility vehicles (SUVs).

In the related art, spacers, rivets, and brackets, which are separate structures, are used and fixed by bolts to mount the roof rack on the vehicle body (the roof panel), which causes an increase in number of components, complicates a structure of the roof rack, and increases costs.

Further, because the roof rack in the related art is mounted on the vehicle body as the bolts penetrate the spacer and then are fastened to nut, a fixing force of the bolts against the spacer is low. For this reason, there is a risk that the roof rack is detached because of a lack of structural durability of the assembly of the roof rack and the vehicle body.

In addition, because the spacer used to assemble the roof rack in the related art has an asymmetric shape, only the roof rack with a particular design suitable for the shape of the spacer needs to be used. For this reason, the roof racks with different designs cannot be used in common with the spacer, which causes a deterioration in utilization and practicality.

In addition, in the related art, to detach the roof rack from the vehicle body to replace and repair the roof rack, an interior material (head lining) in the vehicle is detached first, and then the roof rack is detached by releasing the nut and the bolt. Therefore, during the disassembling process, the interior material in the vehicle needs to be detached to disassemble the roof rack, which complicates the disassembling process, requires a significant amount of time, and particularly, damages the interior material of the vehicle.

The foregoing explained as the background is intended merely to aid in the understanding of the background of the present disclosure, and is not intended to mean that the present disclosure falls within the purview of the related art that is already known to those having ordinary skill in the art.

SUMMARY

The present disclosure provides a roof rack apparatus for a vehicle, which has a reduced number of components and thus simplifies a structure and reduces costs. The present disclosure also provides a roof rack apparatus for a vehicle, which is capable of ensuring structural durability when being assembled with a vehicle body. The present disclosure further provides a roof rack apparatus for a vehicle, in which a roof rack mounting bracket used to assemble a roof rack with a vehicle body has a symmetric shape in a forward/rearward direction and a leftward/rightward direction, such that the roof racks with different designs may be used in common. The present disclosure also provides a roof rack apparatus for a vehicle, which is capable of allowing a roof rack to be easily separated from a vehicle body without detaching an interior material.

In one form of the present disclosure, a roof rack apparatus for a vehicle may include: a roof rack mounting bracket fixedly coupled to a vehicle body; a roof rack stanchion separably coupled to the roof rack mounting bracket by means of a bracket fixing bolt; and a roof rack side rail separably coupled to the roof rack stanchion and configured to define an external appearance of a roof rack.

The roof rack apparatus may further include a roof rack pad positioned between the roof rack stanchion and the vehicle body and configured to prevent the roof rack stanchion from coming into direct contact with the vehicle body.

The roof rack mounting bracket may include an insert bolt and insert nuts integrated by injection molding, the insert bolt may penetrate the vehicle body and be fastened to a nut, and the bracket fixing bolt may penetrate the roof rack stanchion and be fastened to the insert nut.

The insert bolt may be positioned at a central portion of the roof rack mounting bracket, and the roof rack mounting bracket may be symmetric in a forward/rearward direction and a leftward/rightward direction with respect to a center of the insert bolt.

The insert bolt may be positioned at a central portion of the roof rack mounting bracket, and the insert nuts may be positioned respectively at positions symmetric in a longitudinal direction of the roof rack mounting bracket with respect to a center of the insert bolt.

In one embodiment of the present disclosure, the roof rack mounting bracket includes a protrusion portion which protrude upward from a central portion of an upper surface of the roof rack mounting bracket, and an insertion groove portion may be formed in a lower surface of the roof rack stanchion. The protrusion portion may be inserted into the insertion groove portion to lock a centered state of the roof rack mounting bracket.

The roof rack stanchion may have a catching groove portion, the roof rack side rail may have a rail protrusion portion, and the roof rack stanchion and the roof rack side rail may be separably coupled by a catching structure comprising the catching groove portion and the rail protrusion portion.

In a state in which the roof rack mounting bracket, the roof rack stanchion, and the roof rack side rail are coupled to the vehicle body, the roof rack side rail may be separated and decoupled from the roof rack stanchion, the bracket fixing bolt may be released from the roof rack stanchion, the roof rack stanchion may be separated and decoupled from the roof rack mounting bracket, and then the roof rack may be replaced using the roof rack mounting bracket fixed to the vehicle body without detaching an interior material in the vehicle.

The roof rack mounting bracket, the roof rack stanchion, the roof rack side rail, and the roof rack pad may be individually formed by injection molding.

The roof rack apparatus according to the present disclosure includes the roof rack mounting bracket, the roof rack stanchion, the roof rack side rail, and the roof rack pad and does not use components such as spacers and rivets that were used to mount a roof rack in the related art. Therefore, it is possible to simplify the structure and reduce costs by reducing the number of components.

In addition, the roof rack apparatus according to the present disclosure couples the roof rack mounting brackets to the vehicle body using the insert bolts and the nuts and couples the roof rack stanchion to the roof rack mounting brackets using the insert nuts and the bracket fixing bolts. The fastening forces between the insert bolts and the bracket fixing bolts may ensure further improved structural durability at the time of assembling the components with the vehicle body.

In addition, according to the present disclosure, since the roof rack mounting bracket is symmetric in the forward/rearward direction and the leftward/rightward direction with respect to the center of the insert bolt, directionality may not be restricted at the time of assembling the roof rack, and the roof racks may be used in common, which makes it possible to improve utilization and practicality.

In addition, according to the present disclosure, the operator may replace the roof rack with a new roof rack without detaching an interior material (the head lining) in the vehicle. Therefore, it is possible to implement convenience and workability and reduce working time. In particular, it is possible to prevent damage to the interior material in the vehicle at the time of replacing and repairing the roof rack.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

Specific structural or functional descriptions of embodiments of the present disclosure are exemplified only for the purpose of explaining the embodiments according to the present disclosure. The embodiments according to the present disclosure may be carried out in various forms, and it should not be interpreted that the present disclosure is limited to the embodiments described in the present disclosure.

Because the embodiments according to the present disclosure may be variously changed and may have various forms, specific embodiments are illustrated in the drawings and described in detail in the present disclosure. However, the descriptions of the specific embodiments are not intended to limit embodiments according to the concept of the present disclosure to the specific embodiments, but it should be understood that the present disclosure covers all modifications, equivalents and alternatives falling within the spirit and technical scope of the present disclosure.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present disclosure are used only for the purpose of describing particular embodiments and are not intended to limit the present disclosure. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those having ordinary skill in the art to which the present disclosure pertains. The terms such as those defined in a commonly used dictionary should be interpreted as having meanings consistent with meanings in the context of related technologies and should not be interpreted as ideal or excessively formal meanings unless explicitly defined in the present specification.

A control unit (controller) according to an exemplary embodiment of the present disclosure may be implemented by a non-volatile memory (not illustrated) configured to store a set of instructions which implement an algorithm for controlling operations of various constituent elements in a vehicle or store data related to software commands for executing the algorithm by a processor (not illustrated). The processor is configured to perform the following operations by using the data stored in the corresponding memory. In this case, the memory and the processor may be implemented as separate chips. Alternatively, the memory and the processor may be implemented as a single chip in which the memory and the processor are integrated. The processor may be configured in the form of one or more processors.

When a component, device, element, or the like of the present disclosure is described as having a purpose or performing an operation, function, or the like, the component, device, or element should be considered herein as being "configured to" meet that purpose or to perform that operation or function.

Hereinafter, a roof rack apparatus for a vehicle according to an exemplary embodiment of the present disclosure is described with reference to the accompanying drawings.

As illustrated in FIGS. 1 to 7, a roof rack apparatus for a vehicle includes: roof rack mounting brackets 100 fixedly coupled to the vehicle body 10; a roof rack stanchion 300 separably coupled to the roof rack mounting bracket 100 by bracket fixing bolts 200; a roof rack side rail 400 separably coupled to the roof rack stanchion 300 and configured to define an external appearance of a roof rack; and a roof rack pad 500 positioned between the roof rack stanchion 300 and the vehicle body 10 and configured to prevent the roof rack stanchion 300 from coming into direct contact with the vehicle body 10.

Figure 1:
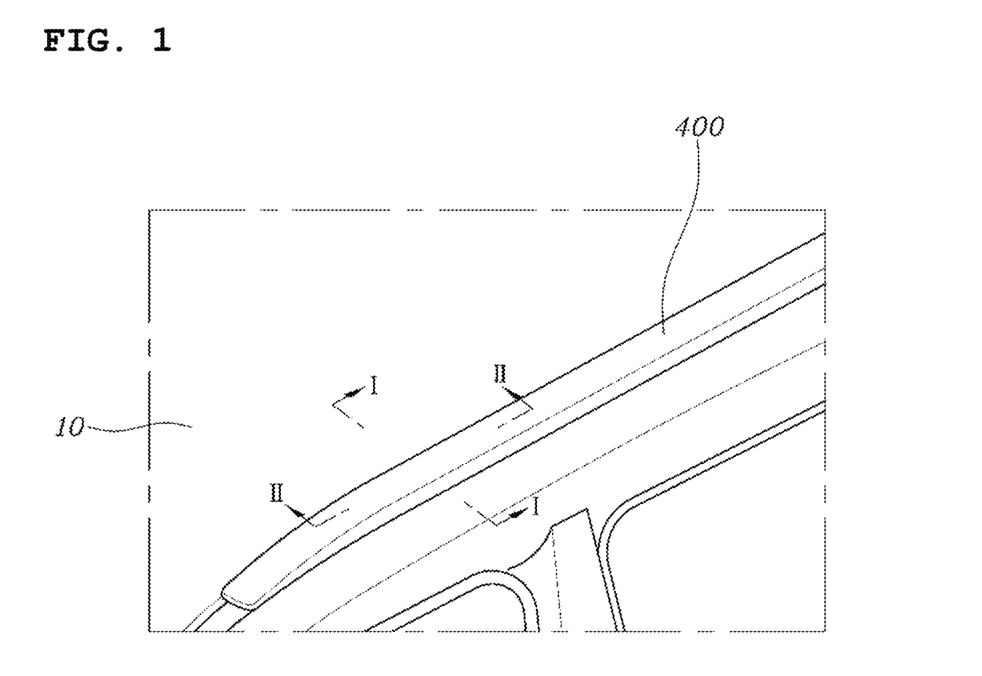
FIG. 1 is a view illustrating a state in which a roof rack apparatus according to one embodiment of the present disclosure is mounted on a vehicle body (a roof panel)
Figure 2:
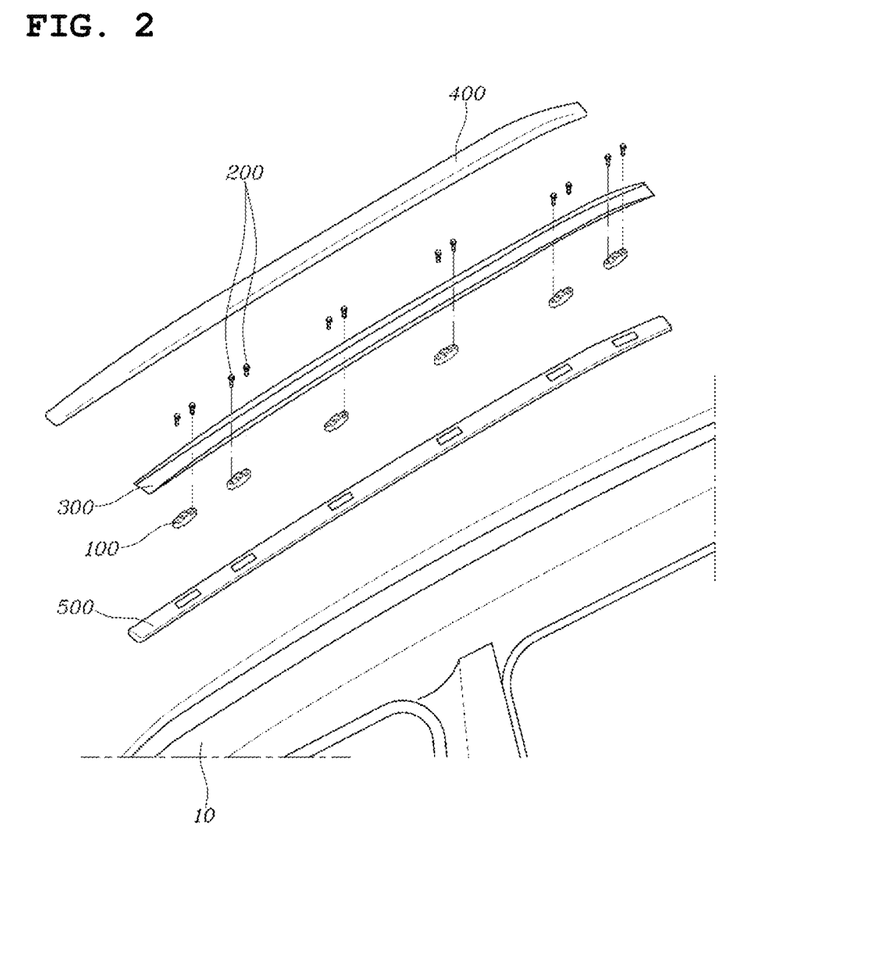
FIG. 2 is an exploded view of the roof rack apparatus according to one embodiment of the present disclosure.

The vehicle body 10 may include a roof panel on which the roof rack is mounted, and the assembly of the roof rack stanchion 300 and the roof rack side rail 400 may be called as the roof rack.

The roof rack stanchion 300, the roof rack side rail 400, and the roof rack pad 500 extend straight in a forward/rearward direction of the vehicle and are disposed at each of the left and right sides of the vehicle body 10 (e.g., the roof panel). In one form, the plurality of roof rack mounting brackets 100 are fixed to the vehicle body 10, disposed at the left and right sides of the vehicle body 10 (e.g., the roof panel), and spaced apart from one another at predetermined intervals in the forward/rearward direction of the vehicle.

In another form, the roof rack mounting brackets 100, the roof rack stanchion 300, the roof rack side rail 400, and the roof rack pad 500 are individually manufactured by plastic injection molding. Therefore, it is possible to easily manufacture the components of the roof rack with a non-complicated, simple shape.

The roof rack apparatus includes the roof rack mounting bracket 100, the roof rack stanchion 300, the roof rack side rail 400, and the roof rack pad 500 and does not require components such as spacers and rivets that were used to mount a roof rack on a vehicle body in the related art. Therefore, it is possible to simplify the structure and reduce costs by reducing the number of components.

Figure 3:
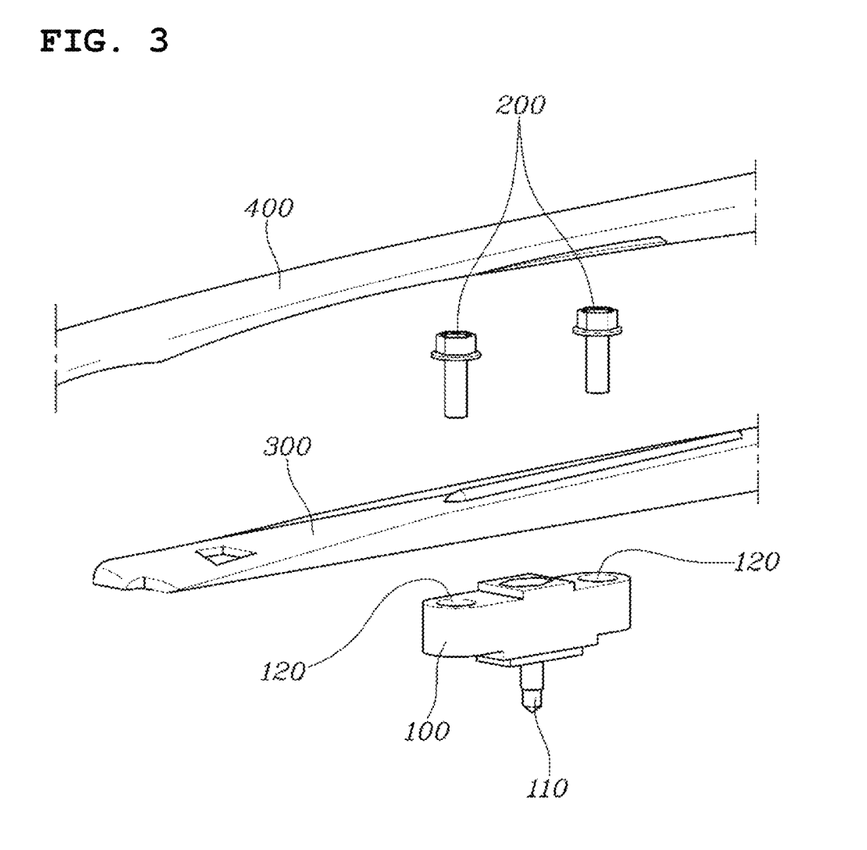
FIG. 3 is a partially enlarged view of FIG. 2.

In another form of the present disclosure, the roof rack mounting bracket 100 may include an insert bolt 110 and insert nuts 120 which are integrated by injection molding.

Figure 4:
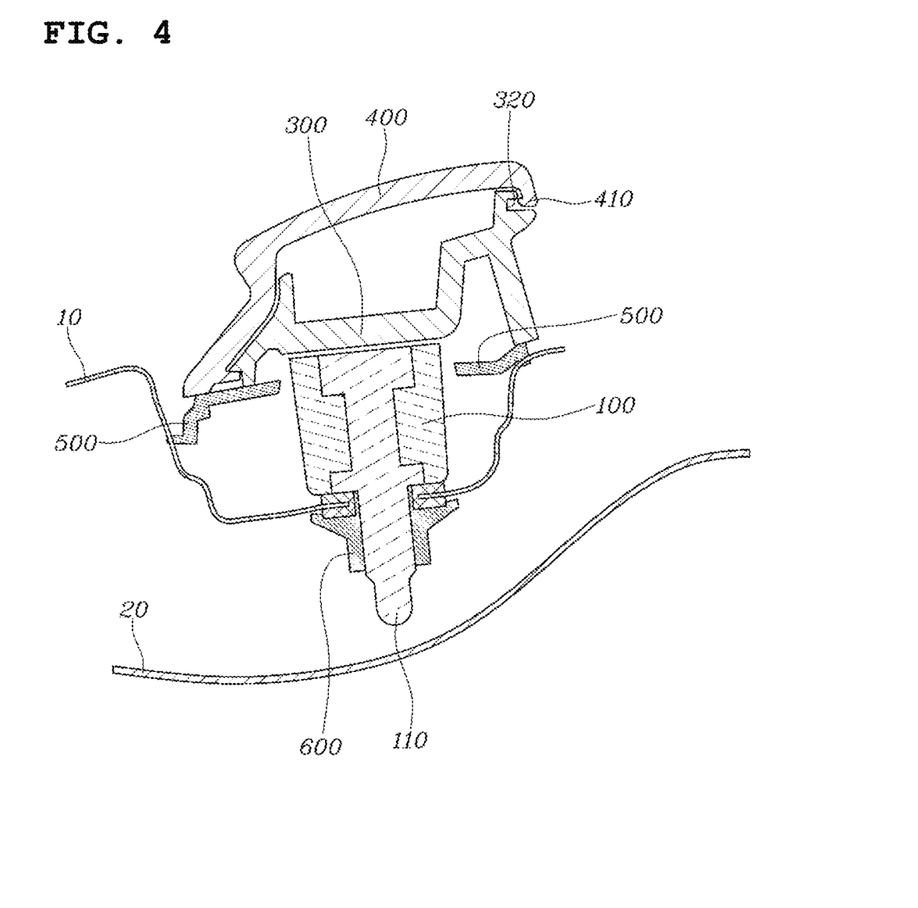
FIGS. 4 to 5 are cross-sectional views taken along lines I-I and II-II in FIG. 1.
Figure 5:
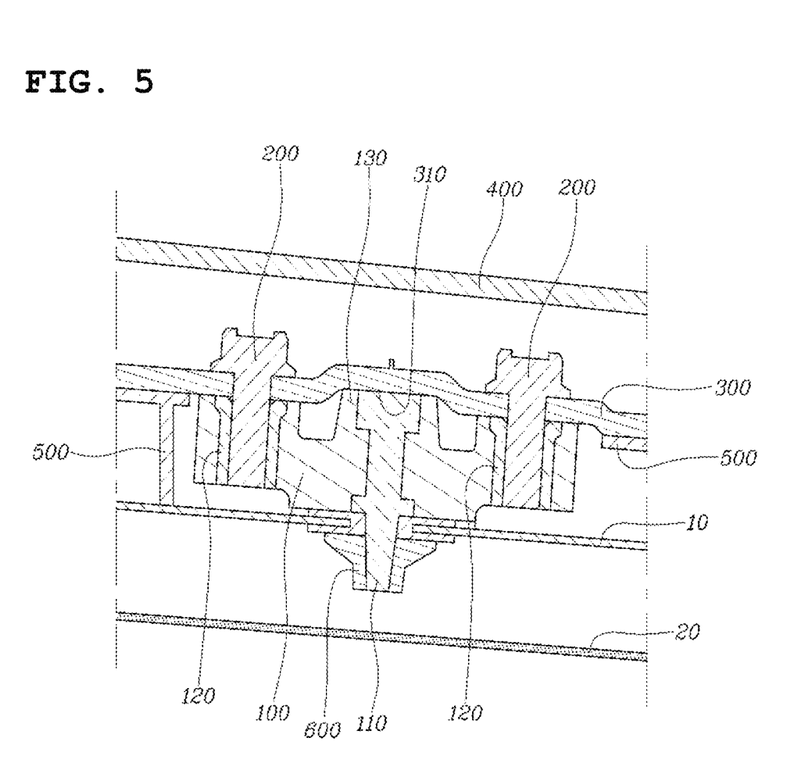

The insert bolt 110 penetrates the vehicle body 10 and is fastened to a nut 600. The bracket fixing bolt 200 penetrates the roof rack stanchion 300 and is fastened to the insert nut 120.

The roof rack apparatus couples the roof rack mounting brackets 100 to the vehicle body 10 using the insert bolts 110 and the nuts 600. The roof rack stanchion 300 is coupled to the roof rack mounting brackets 100 by the insert nuts 120 and the bracket fixing bolts 200. The fastening forces between the insert bolts 110 and the bracket fixing bolts 200 may provide improved structural durability at the time of assembling the components with the vehicle body 10.

Figure 6:
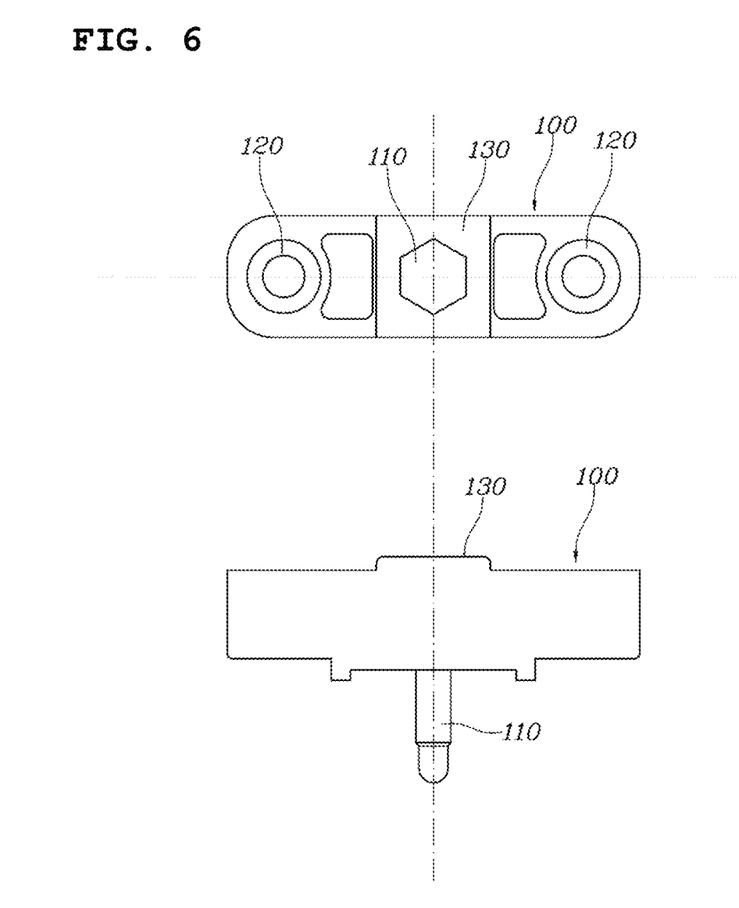
FIG. 6 is a top plan view and a front view for explaining a roof rack mounting bracket according to one embodiment of the present disclosure.

According to another form of the present disclosure, the insert bolt 110 is positioned at a central portion of the roof rack mounting bracket 100, and the roof rack mounting bracket 100 is symmetric in a forward/rearward direction and a leftward/rightward direction with respect to a center of the insert bolt 110.

Since the roof rack mounting bracket 100 is symmetric in the forward/rearward direction and the leftward/rightward direction with respect to the center of the insert bolt 110, directionality is not restricted at the time of assembling the roof rack, and the roof racks may be used in common, which makes it possible to improve utilization and practicality.

According to one embodiment of the present disclosure, one insert bolt 110 is positioned at the central portion of the roof rack mounting bracket 100, and two insert nuts 120 are positioned one by one at positions symmetric in a longitudinal direction of the roof rack mounting bracket 100 with respect to the center of the insert bolt 110.

According to an embodiment of the present disclosure, the roof rack mounting bracket 100 includes a protrusion portion 130 which protrudes upward from a central portion of an upper surface of the roof rack mounting bracket 100, and an insertion groove portion 310 is formed in a lower surface of the roof rack stanchion 300. The protrusion portion 130 is inserted into the insertion groove portion 310 to lock a centered state of the roof rack mounting bracket 100.

The roof rack mounting bracket 100 and the roof rack stanchion 300 may be more easily coupled using the bracket fixing bolts 200 by a male-female coupling structure between the protrusion portion 130 and the insertion groove portion 310 at the time of assembling the roof rack. In particular, because the centered state of the roof rack mounting bracket 100 is locked, the assembling process may be more smoothly performed.

According to another embodiment of the present disclosure, the roof rack stanchion 300 has a catching groove portion 320, and the roof rack side rail 400 has a rail protrusion portion 410. The roof rack stanchion 300 and the roof rack side rail 400 are separably coupled to each other, without using a separate bolt, by a catching structure between the catching groove portion 320 and the rail protrusion portion 410.

Hereinafter, a process of assembling and disassembling the roof rack apparatus according to one embodiment of the present disclosure is described.

The insert bolt 110 provided on the roof rack mounting bracket 100 penetrates the vehicle body 10 (the roof panel) and is fastened to the nut 600, such that the roof rack mounting bracket 100 is fixed to the vehicle body 10.

The bracket fixing bolts 200 penetrate the roof rack stanchion 300 and are fastened to the insert nuts 120 provided in the roof rack mounting bracket 100, such that the roof rack stanchion 300 is coupled to the roof rack mounting bracket 100.

The rail protrusion portion 410 formed on the roof rack side rail 400 is inserted into the catching groove portion 320 formed in the roof rack stanchion 300, and the roof rack side rail 400 is coupled to the roof rack stanchion 300, such that the roof rack is mounted on the vehicle body 10 (the state illustrated in FIG. 1).

Figure 7A:
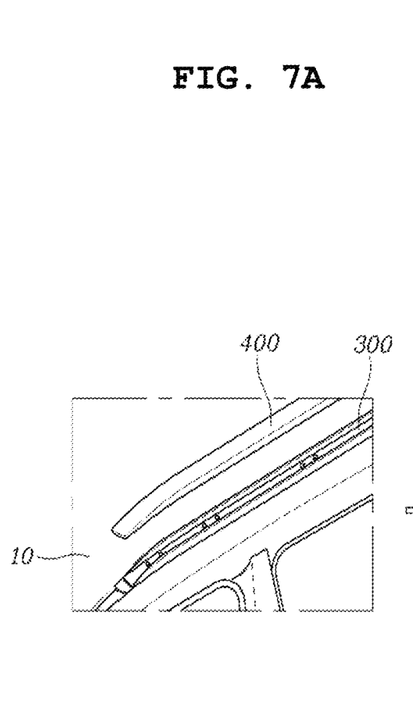
FIGS. 7A, 7B and 7C are views for explaining a process of disassembling the roof rack apparatus according to one embodiment of the present disclosure.
Figure 7B:
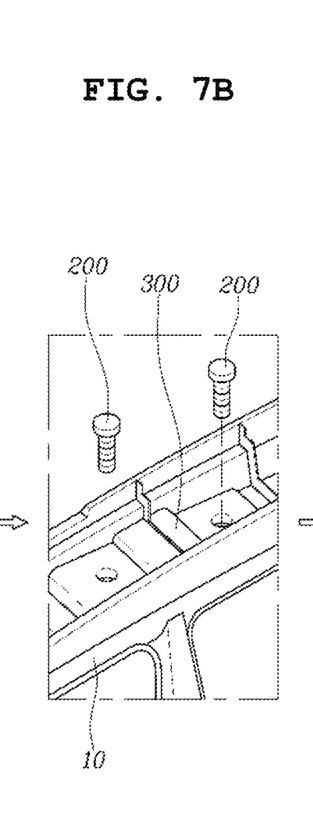
Figure 7C:
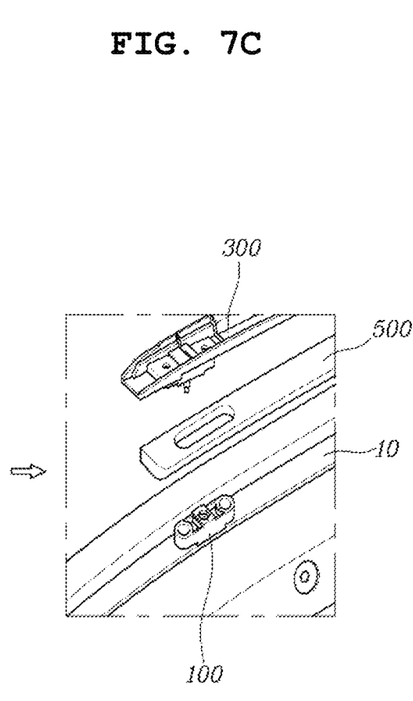

In the state in which the roof rack mounting bracket 100, the roof rack stanchion 300, and the roof rack side rail 400 are coupled to the vehicle body 10 as described above, the roof rack side rail 400 is separated and decoupled from the roof rack stanchion 300 (see FIG. 7A), the bracket fixing bolts 200 are released from the roof rack stanchion 300 (see FIG. 7B), and the roof rack stanchion 300 and the roof rack pad 500 are separated and decoupled from the roof rack mounting bracket 100 (see FIG. 7C).

When the roof rack stanchion 300 is separated from the roof rack mounting bracket 100, the roof rack mounting bracket 100 is kept fixed to the vehicle body 10 (the roof panel) by the fastening between the insert bolt 110 and the nut 600. An operator may replace or repair the roof rack by assembling a new roof rack stanchion 300 and a new roof rack side rail 400.

In other words, the operator may replace the roof rack with a new roof rack without detaching an interior material 20 (e.g., the head lining) in the vehicle. Therefore, the present disclosure improves convenience and workability and reduces working time for disassembling and reassembling the roof rack. In particular, it is possible to prevent damage to the interior material 20 in the vehicle at the time of replacing and repairing the roof rack.

As described above, the roof rack apparatus for a vehicle according to the present disclosure includes the roof rack mounting bracket 100, the roof rack stanchion 300, the roof rack side rail 400, and the roof rack pad 500 and does not use components such as spacers and rivets that were used to mount a roof rack on a vehicle body in the related art. Therefore, it is possible to simplify the structure and reduce costs by reducing the number of components.

In addition, the roof rack apparatus according to the present disclosure couples the roof rack mounting brackets 100 to the vehicle body 10 using the insert bolts 110 and the nuts 600 and couples the roof rack stanchion 300 to the roof rack mounting brackets 100 using the insert nuts 120 and the bracket fixing bolts 200. The fastening forces between the insert bolts 110 and the bracket fixing bolts 200 may provide further improved structural durability at the time of assembling the components with the vehicle body 10.

In addition, according to the present disclosure, because the roof rack mounting bracket 100 is symmetric in the forward/rearward direction and the leftward/rightward direction with respect to the center of the insert bolt 110, directionality may not be an issue at all at the time of assembling the roof rack, and the roof racks may be used in common, which makes it possible to improve utilization and practicality.

In addition, according to the present disclosure, the operator may replace the roof rack with a new roof rack without detaching an interior material 20 (e.g., the head lining) in the vehicle. Therefore, the present disclosure improves convenience and workability and reduces working time. In particular, it is possible to prevent damage to the interior material 20 in the vehicle at the time of replacing and repairing the roof rack.

While the specific embodiments of the present disclosure have been illustrated and described, it should be obvious to those having ordinary skill in the art that the present disclosure may be variously modified and changed without departing from the technical spirit of the present disclosure.

What is claimed is:

1. A roof rack apparatus for a vehicle, the roof rack apparatus comprising:
a roof rack mounting bracket fixedly coupled to a vehicle body;
a roof rack stanchion separably coupled to the roof rack mounting bracket by a bracket fixing bolt; and
a roof rack side rail separably coupled to the roof rack stanchion and configured to define an external appearance of a roof rack,
wherein the roof rack mounting bracket comprises an insert bolt and insert nuts integrated by injection molding, and
wherein the insert bolt is configured to penetrate the vehicle body and is fastened to a nut, and the bracket fixing bolt is configured to penetrate the roof rack stanchion and is fastened to the insert nut.

2. The roof rack apparatus of claim 1, further comprising:
a roof rack pad positioned between the roof rack stanchion and the vehicle body and configured to prevent the roof rack stanchion from coming into direct contact with the vehicle body.

3. The roof rack apparatus of claim 2, wherein the roof rack mounting bracket, the roof rack stanchion, the roof rack side rail, and the roof rack pad are individually formed by injection molding.

4. The roof rack apparatus of claim 1, wherein the insert bolt is positioned at a central portion of the roof rack mounting bracket, and the roof rack mounting bracket is symmetric in a forward/rearward direction and a leftward/rightward direction with respect to a center of the insert bolt.

5. The roof rack apparatus of claim 1, wherein the insert bolt is positioned at a central portion of the roof rack mounting bracket, and the insert nuts are positioned respectively at positions symmetric in a longitudinal direction of the roof rack mounting bracket with respect to a center of the insert bolt.

6. The roof rack apparatus of claim 1, wherein the roof rack mounting bracket includes a protrusion portion which protrudes upward from a central portion of an upper surface of the roof rack mounting bracket, and
wherein an insertion groove portion is formed in a lower surface of the roof rack stanchion, and the protrusion portion is inserted into the insertion groove portion to lock a centered state of the roof rack mounting bracket.

7. The roof rack apparatus of claim 1, wherein the roof rack stanchion includes a catching groove portion, the roof rack side rail includes a rail protrusion portion, and the roof rack stanchion and the roof rack side rail are separably coupled by a catching structure comprising the catching groove portion and the rail protrusion portion.

8. The roof rack apparatus of claim 1, wherein while the roof rack mounting bracket is coupled to the vehicle body, the roof rack side rail is configured to be separated and decoupled from the roof rack stanchion, the bracket fixing bolt is configured to be released from the roof rack stanchion, and the roof rack stanchion is configured to be separated and decoupled from the roof rack mounting bracket, such that the roof rack is replaced without detaching an interior material in the vehicle.

9. A roof rack apparatus for a vehicle, the roof rack apparatus comprising:
a roof rack mounting bracket fixedly coupled to a vehicle body;
a roof rack stanchion separably coupled to the roof rack mounting bracket by a bracket fixing bolt;
a roof rack side rail separably coupled to the roof rack stanchion and configured to define an external appearance of a roof rack; and
a roof rack pad positioned between the roof rack stanchion and the vehicle body and configured to prevent the roof rack stanchion from coming into direct contact with the vehicle body,
wherein the roof rack mounting bracket, the roof rack stanchion, the roof rack side rail, and the roof rack pad are individually formed by injection molding.

* * * * *